United States Patent
Chai et al.

(10) Patent No.: US 9,516,157 B2
(45) Date of Patent: Dec. 6, 2016

(54) METHOD AND SYSTEM FOR UNLOCKING MOBILE PHONE SCREEN

(71) Applicant: HUIZHOU TCL MOBILE COMMUNICATION CO., LTD., Huizhou (CN)

(72) Inventors: Feifei Chai, Huizhou (CN); Jianqiang Chen, Huizhou (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 0 days.

(21) Appl. No.: 14/418,786

(22) PCT Filed: Aug. 12, 2013

(86) PCT No.: PCT/CN2013/081267
§ 371 (c)(1),
(2) Date: Jan. 30, 2015

(87) PCT Pub. No.: WO2014/131268
PCT Pub. Date: Sep. 4, 2014

(65) Prior Publication Data
US 2015/0229757 A1 Aug. 13, 2015

(30) Foreign Application Priority Data

Feb. 27, 2013 (CN) .......................... 2013 1 0061546

(51) Int. Cl.
*H04M 1/66* (2006.01)
*H04M 1/725* (2006.01)
(Continued)

(52) U.S. Cl.
CPC ...... *H04M 1/72577* (2013.01); *G06F 3/04883* (2013.01); *G06F 21/36* (2013.01);
(Continued)

(58) Field of Classification Search
CPC H04M 1/72577; H04M 1/67; H04M 2250/22; H04W 12/06; H04W 12/08; H04W 88/02; G06F 3/04883; H04L 63/0861; H04L 63/108
(Continued)

(56) References Cited

U.S. PATENT DOCUMENTS 8,543,397 B1 * 9/2013 Nguyen .............. G06F 3/04883
704/235
2010/0173679 A1 7/2010 Moon
(Continued)

FOREIGN PATENT DOCUMENTS

| CN | 101488987 A | 7/2009 |
| CN | 102566818 A | 7/2012 |
| CN | 103139390 A | 6/2013 |

*Primary Examiner* — Shahriar Behnamian
(74) *Attorney, Agent, or Firm* — Shimokaji IP

(57) ABSTRACT

A method and system for unlocking a mobile phone screen includes, in a locked state, the mobile phone receives a user instruction, lights up a mobile phone screen, and enters an unlocking interface. In a case that a touching event has been detected within a per-determined time period, touching region information, corresponding to the touching event, is obtained and a touching area is calculated based on the touching region information. The touching area is compared with a per-determined threshold and, when the touching area is larger than the pre-determined threshold, the touching event is determined to meet a requirement for unlocking, and the mobile phone is controlled to unlock the mobile phone screen. Otherwise, unlocking failure information is returned to the user. Thereby, mobile phone screen unlocking is achieved by way of a large area touching of a mobile phone screen.

20 Claims, 2 Drawing Sheets

(51) Int. Cl.
*G06F 3/0488* (2013.01)
*H04W 12/08* (2009.01)
*H04M 1/67* (2006.01)
*H04W 12/06* (2009.01)
*G06F 21/36* (2013.01)
*H04L 29/06* (2006.01)
*H04W 88/02* (2009.01)

(52) U.S. Cl.
CPC ............ *H04M 1/67* (2013.01); *H04W 12/06* (2013.01); *H04W 12/08* (2013.01); *H04L 63/0861* (2013.01); *H04L 63/108* (2013.01); *H04M 2250/22* (2013.01); *H04W 88/02* (2013.01)

(58) Field of Classification Search
USPC ........................................ 455/410, 411, 26.1
See application file for complete search history.

(56) References Cited

U.S. PATENT DOCUMENTS

| 2013/0069897 | A1* | 3/2013 | Liu | G06F 3/0488 |
| | | | | 345/173 |
| 2013/0271393 | A1* | 10/2013 | Wang | G06F 3/04883 |
| | | | | 345/173 |

* cited by examiner

METHOD AND SYSTEM FOR UNLOCKING MOBILE PHONE SCREEN

TECHNICAL FIELD

The present disclosure relates to the field of mobile terminals and, in particular, the present disclosure relates to a method and system for unlocking a mobile phone screen through touching a region having a certain area.

BACKGROUND

With development of mobile terminal technology, almost every smart phone, currently available on the market, has a touch screen. In order to prevent an accidental touching on the screen, which may result in an undesired operation, a wide variety of methods for locking smart phone screens have been proposed. Accordingly, a wide variety of corresponding methods for unlocking the smart phone screen have also appeared, such as sliding a finger up and down (vertically) on the screen, sliding a finger left and right (horizontally) on the screen, drawing an arc on the screen with a finger, drawing other specific shapes on the screen with a finger, and the like.

Methods for unlocking mobile phone screens, in the existing technology, typically include unlocking the screen through touching the screen on a small area and sliding with specific track. Limited by size of mobile phone screen and size of human fingers, and other factors as well, known screen unlocking methods have requirements for accuracies of a touching point and sliding track. As a result, unlocking attempts can easily fail, and users often need to make multiple attempts in order to successfully unlock the screen, which is an inconvenience to the users.

Therefore, the prior art is yet to be modified and improved.

SUMMARY

The technical problems that the present invention solves are associated with deficiencies in the existing technology, and a method and system for mobile phone screen unlocking are provided through touching on a region of the screen having a certain area. The present disclosure solves the problem associated with currently available methods for unlocking mobile phone screens, such as requirements for touching point and sliding track accuracy.

In order to solve the above identified technical problems, a method for unlocking a mobile phone screen includes receiving, at the mobile phone, an instruction from a user while the screen of the mobile phone is in a locked state; lighting up the screen of the mobile phone and entering an unlocking interface; detecting whether a touching event occurs within a predetermined time period after the unlocking interface is entered; if the touching event is not detected within the predetermined time period, turning off a backlight of the screen of the mobile phone; if the touching event is detected within the predetermined time period: obtaining information of a touching region corresponding to the touching event, and calculating a touching area according to the information of the touching region; comparing the touching area with a predetermined threshold, and determining whether the touching event satisfies a condition required for unlocking; when the touching area is larger than the threshold, determining that the touching event satisfies the condition required for unlocking, and to unlocking the screen of the mobile phone; and when the touching area is not larger than the threshold, returning, to the user, information indicative of an unlocking failure.

In another embodiment, a method for unlocking a screen of a mobile phone includes pre-setting a threshold for determining whether to unlock the screen of the mobile phone according to a size of the screen and a size of a palm of the user.

In a further embodiment, a method for unlocking a screen of a mobile includes information of a touching region that is profile information of a coordinate matrix of a touching region.

In another embodiment, a method for unlocking a screen of a mobile includes dividing a touching region into a plurality of regular small shapes according to profile information of a coordinate matrix of a touching region, calculating respective areas of the plurality of regular small shapes, and adding the respective areas to determine the touching area.

In yet another embodiment, a method for unlocking a screen of a mobile phone includes a threshold that is 20 square centimeters.

In yet a further embodiment, a system for unlocking a screen of a mobile phone includes a detection module for detecting whether a touching event occurs on the screen; a calculation module for calculating a touching area; a determination module for determining whether a touching event satisfies a condition for unlocking the screen; and a control module for unlocking the screen or returning information indicative of an unlocking error; and when the detection module detects that the mobile phone has entered an unlocking interface, the detection module detects whether a touching event occurs on the screen of the mobile phone within a pre-determined time period; when the touching event has not been detected, a backlight of the screen of the mobile phone is turned off; when the touching event has been detected: information of a touching region, corresponding to the touching event, is obtained and sent to the calculation module by the determination module; a touching area is calculated, by the calculation module, based on the information of the touching region; the touching area is compared with a predetermined threshold by the determination module, and the determination module determines whether the touching event satisfies a condition required for unlocking; when the touching area is determined to be greater than the predetermined threshold, the determination module determines that the touching event satisfies the condition required for unlocking and sends, to the control module, an instruction for unlocking the screen; and the control module unlocks the screen; when the touching area is determined to not be greater than the predetermined threshold, the determination module sends an instruction, indicative of an unlocking failure, to the control module and the control module returns information indicative of an unlocking failure to the user.

In another embodiment, a system for unlocking a screen of a mobile phone comprises a setting module for setting a threshold based on a size of the screen and a size of a palm.

In a further embodiment, in a system for unlocking a screen of a mobile phone information of a touching region is profile information of a coordinate matrix of a touching region and a threshold is 20 square centimeters.

In yet another embodiment, in a system for unlocking a screen of a mobile phone a calculation module includes a dividing unit for dividing a touching region into a plurality of regular small shapes based on profile information of a coordinate matrix of a touching region, and calculating respective areas of the plurality of regular small shapes; and an addition unit for adding the respective areas of the plurality of regular small shapes to determine a touching area.

A method and system for unlocking a mobile phone screen via touching on a region having a certain area is provided. By touching an area on a mobile phone screen, the method and system are able to unlock a mobile phone screen quickly and conveniently. When unlocking the mobile phone screen, the requirements for accuracies of touching point and sliding track have been lowered compared with known screen unlocking requirements, and user operation has been simplified. When the mobile phone enters an unlocking interface, a detected operation event, of a large screen area touched by a user, is used for controlling the mobile phone to quickly unlock a screen to provide convenience to the user.

DETAIL DESCRIPTION

In order to make the present invention and advantages of associated technical solutions clear, the present invention will be described with reference to the accompanying drawings and exemplary embodiments. The exemplary embodiments are for illustrative purposes and are not intended to limit the scope of the appending claims in any way.

Figure 1:
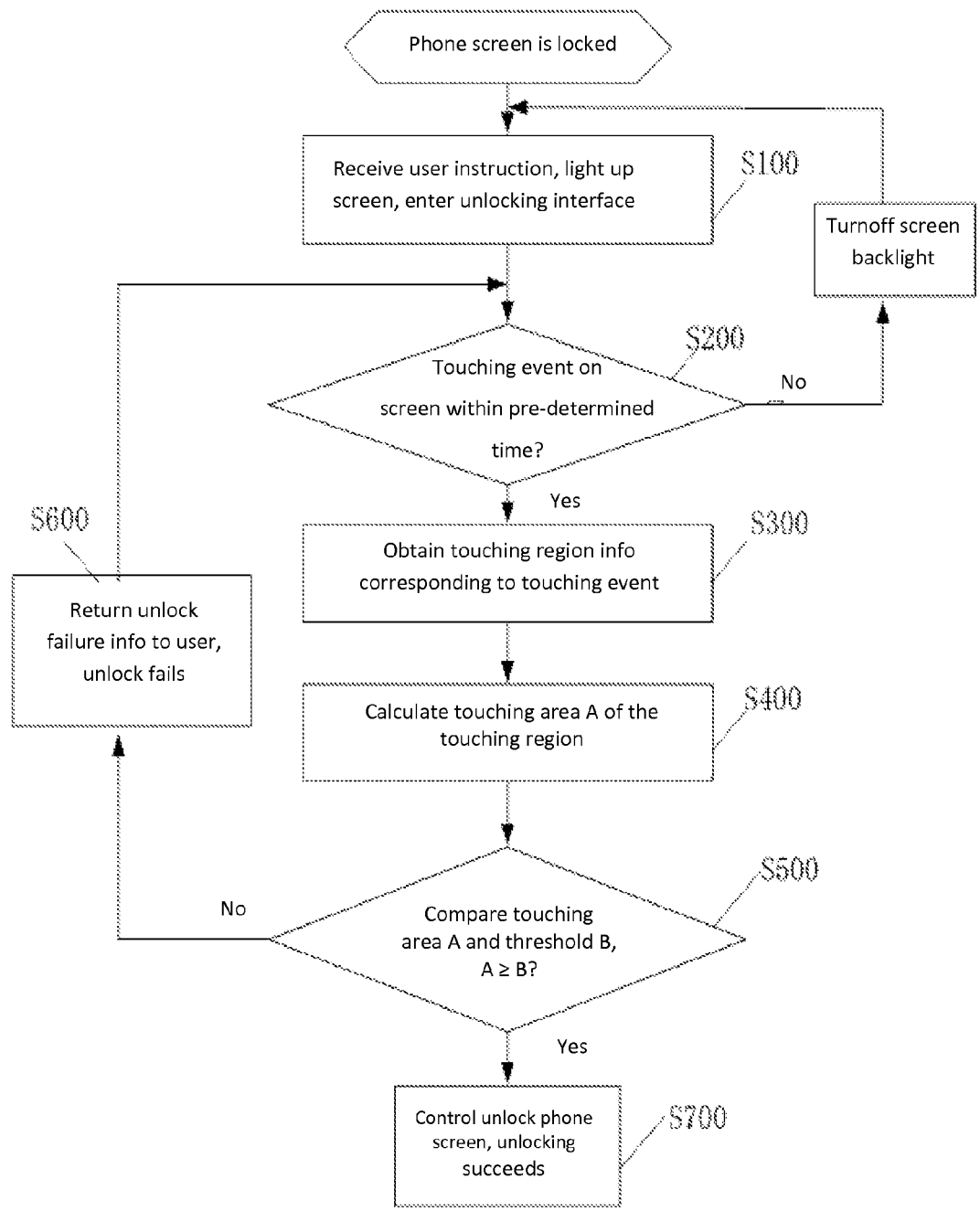
FIG. 1 depicts a flow diagram of an embodiment of a method for unlocking a mobile phone screen in the present invention.

With reference to FIG. 1, a flow diagram of an embodiment of a method for unlocking a mobile phone screen may include a mobile phone screen in a locking state. In order to unlock the mobile phone screen, an instruction from a user may be received (block S100). The method may further include lighting up the screen, and entering an unlocking interface. When the mobile phone screen is in a locking state, a user may operate a related key or button to light up the screen, and accordingly, initiate an unlocking program to enter the unlocking interface.

The method for unlocking a mobile phone screen may further include detecting whether a touching event occurs within a pre-determined time period after entering the unlocking interface (block S200). In operation, an internal timer of the mobile phone may be started at a same time when the mobile phone enters the unlocking interface. If no touching event has been detected during the pre-determined time period (block S200), a backlight of the mobile phone screen may turned off, and the method may return to block S100. If a touching event has been detected on the mobile phone screen (block S200), information of a touching region corresponding to the touching event may be obtained (block S300). More specifically, following the mobile phone entering the unlocking interface, and before the above mentioned timer stops, a user may use his or her palm to touch the screen of the mobile phone. The mobile phone may be able to detect this touching event, and may obtain the profile information of the coordinate matrix of the touching region, which may correspond to a touching event.

The method for unlocking a mobile phone screen may also include calculating a touching area based on the information of the touching region (block S400). The touching region may be divided into a plurality of regular small shapes based on the obtained profile information of the coordinate matrix, respectively areas of the plurality of regular small shapes may be calculated, and the respective areas may be added together to determine the touching area, which is denoted as A in the Figures.

The method for unlocking a mobile phone screen may further include comparing the touching area A with a pre-determined threshold B, and determining whether the touching event satisfies a condition required for unlocking, i.e., determining whether the relation of A≥B has been satisfied (block S500). When A≥B, the method for unlocking a mobile phone screen may determine that the touching event satisfies the condition required for unlocking (block S500), and may perform block S700. Otherwise, the touching event may be determined to not satisfy the condition required for unlocking (block S500), and information of unlocking failure may be returned to the user, the unlocking may fail and the method may return to block S200.

The method for unlocking a screen of a mobile phone may further include controlling to unlock the mobile phone screen and unlocking succeeds (block S700). The threshold B, for determining whether to unlock the mobile phone screen, may be pre-set. For example, the threshold B may be pre-set based on a size of the screen and a size of a palm. For example, a length and width of a palm of an average person may be about 5 to 7 cm. Accordingly, a contact area of an average palm on a screen could be at least 25 square centimeters. Thus, the threshold B could be set as 25 square centimeters. As a result, when an area of the mobile phone screen touched by the user's palm is equal to or larger than 25 square centimeters, a current touching event may be determine to satisfy the condition required for unlocking, and thus unlocking may succeed.

Considering the fact that it is quite difficult to make every point of a user's palm sufficiently touch a mobile phone screen, it is very possible that the actual touching area is smaller than 25 square centimeters. Accordingly, in order to avoid making a wrong determination, the threshold may be pre-set as 20 square centimeters. Thus, when an area of the mobile phone screen touched by the user's palm is equal to or larger than 20 square centimeters, a current touching event may be determined to satisfy the condition required for unlocking, thus unlocking may succeed.

On the other hand, due to the fact that some mobile phones have quite large screens, such as mobile phone screens of 4 in or 5 in, or even bigger (such as the screen of a tablet computer), an associated contact area may actually cover the user's whole palm. In other words, a contact area may not only include the contact area of the palm and the screen, but may also include a contact area of fingers and the screen. As a result, the actual touching area may be way larger than 20 square centimeters. In such a case, the threshold can still be set as 20 square centimeters. Accordingly, a user can easily unlock the mobile phone screen. Of course, a user may set the threshold as 30 square centimeters, which could help to improve unlocking security.

In addition, a user can also set a specific threshold B corresponding to a shape of his or her hand, to render an unlocking operation based on more personal characteristics, which may further improve unlocking security for mobile phone or other devices.

It is noted that the setting of the threshold includes but is not limited to the above described embodiments.

A method for unlocking a mobile phone screen may include user selectable features where a user is able to unlock a mobile phone screen quickly and conveniently, without requirements for touching operation of high accuracy, and without requirements for a specific finger sliding track. As a result, user operation may be simplified, and unlocking security may be improved.

Figure 2:
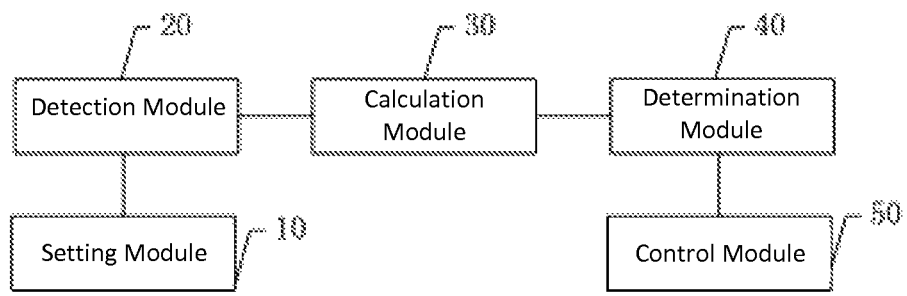
FIG. 2 depicts a diagram of a mechanism of an embodiment of a system for unlocking a mobile phone screen in the present invention.

A system for unlocking a screen of a mobile phone, as shown in FIG. 2, may include a setting module 10 for setting a threshold for determining whether to unlock a screen of the mobile phone based on a size of a screen and a size of a palm of the user. Setting a of the threshold may be as described in the above. For example, the threshold may be set as 20 square centimeters.

The system for unlocking a screen of a mobile phone may include a detection module 20 for detecting, when the mobile phone enters an unlocking interface, whether a touching event occurs on the screen of the mobile phone within a pre-determined time period after the unlocking interface is entered. When one touching event has been detected, information of a touching region may be obtained corresponding to the touching event, and the information of the touching region may be sent to a calculation module. Otherwise, a backlight of the screen of the mobile phone may be turned off. Touching region information may be profile information of a coordinate matrix of the touching region.

The system for unlocking a screen of a mobile phone may include a calculation module 30 for calculating a touching area based on the information of the touching region as described in detail above.

The system for unlocking a screen of a mobile phone may include a determination module 40 for comparing a touching area with a pre-determined threshold, and for determining whether a touching event satisfies a condition required for unlocking. When the touching area is greater than the pre-determined threshold, the touching event may be determined to satisfy the condition required for unlocking the screen, and may send an instruction for unlocking to a control module 50. Otherwise, the determination module 40 may send an instruction indicative of an unlocking failure to the control module 50. Functional details of the determination module 40 may be as described above.

The system for unlocking a screen of a mobile phone may include a control module 50 for, when receiving the instruction for unlocking, unlocking the screen of the mobile phone, and when receiving the instruction of unlocking failure, for returning information of unlocking failure to the user. Functional details of the control module 50 may be as described above.

Figure 3:
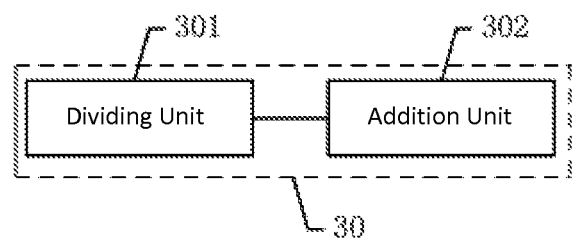
FIG. 3 depicts a diagram of a mechanism of a calculation module of an embodiment of a system for unlocking a mobile phone screen in the present invention.

Turning to FIG. 3, a calculation module 30 may include a dividing unit 301 for dividing a touching region into a plurality of regular small shapes according to profile information of a coordinate matrix of a touching region, and for calculating respective areas of the plurality of regular small shapes. The calculation module 30 may also include an addition unit 302 for adding the respective areas of the plurality of regular small shapes to determine the touching area. Functional details of the calculation module 30 may be as described above.

A method and system are provided for unlocking a mobile phone screen via touching a large area of the mobile phone screen. When unlocking the mobile phone screen, touching point and sliding track accuracy requirements may be lowered compared to known screen unlocking methods and systems, user operation may be simplified; and unlocking security may be improved.

It should be understood that applications of the present invention are not limited to the above examples. A person of ordinary skill in the art may be able to make modifications or alternations according to the above description. All such modifications and alternations should fall within the scope of the appended claims.

The invention claimed is:

1. A method for unlocking a screen of a mobile phone, comprising:
    receiving, at the mobile phone, an instruction from a user while the screen of the mobile phone is in a locked state;
    lighting up the screen of the mobile phone and entering an unlocking interface;
    detecting whether a touching event occurs within a pre-determined time period after the unlocking interface is entered;
    if the touching event is not detected within the predetermined time period, turning off a backlight of the screen of the mobile phone;
    if the touching event is detected within the predetermined time period:
    obtaining information of a touching region corresponding to the touching event, and calculating a touching area according to the information of the touching region, wherein the touching region is divided into a plurality of regular small shapes, wherein respective areas of the plurality of regular small shapes are calculated and added together to determine the touching area;
    comparing the touching area with a predetermined threshold, and determining whether the touching event satisfies a condition required for unlocking;
    when the touching area is larger than the threshold, determining that the touching event satisfies the condition required for unlocking, and unlocking the screen of the mobile phone, wherein the threshold is an area size; and
    when the touching area is not larger than the threshold, returning, to the user, information indicative of an unlocking failure.

2. The method for unlocking a screen of a mobile phone as in claim 1, further comprising:
    pre-setting the predetermined threshold based on size of the screen and a size of a palm of the user.

3. The method for unlocking a screen of a mobile phone as in claim 1, wherein the information of the touching region is profile information of a coordinate matrix of the touching region.

4. The method for unlocking a screen of a mobile phone as in claim 3, wherein the touching event comprises simultaneously touching the regular small shapes.

5. The method for unlocking a screen of a mobile phone as in claim 1, wherein the predetermined threshold is 20 square centimeters.

6. A method for unlocking a screen of a mobile phone, comprising:
    pre-setting a threshold, for determining whether to unlock the screen of the mobile phone, based on a size of the screen and a size of a palm of the user, wherein the threshold is an area size;
    receiving, at the mobile phone, an instruction from a user while the screen of the mobile phone is in a locked state;
    lighting up the screen and entering an unlocking interface; and detecting whether a touching event occurs within a predetermined time period after the unlocking interface is entered;

if the touching event is not detected within the predetermined time period, turning off a backlight of the screen of the mobile phone;

if the touching event is detected within the predetermined time period:

obtaining profile information of a coordinate matrix of a touching region corresponding to the touching event; and calculating a touching area based on the profile information of the coordinate matrix of the touching region, wherein the touching region is divided into a plurality of regular small shapes, wherein respective areas of the plurality of regular small shapes are calculated and added together to calculate the touching area;

comparing the touching area with the threshold, and determining whether the touching event satisfies a condition required for unlocking;

when the touching area is larger than the threshold, determining that the touching event satisfies the condition required for unlocking, and unlocking the screen of the mobile phone; and when the touching area is not larger than the threshold, returning, to the user, information indicative of an unlocking failure.

7. The method for unlocking a screen of a mobile phone as in claim 6, wherein the touching event comprises simultaneously touching the regular small shapes.

8. The method for unlocking a screen of a mobile phone as in claim 6, wherein the threshold is 20 square centimeters.

9. The method for unlocking a screen of a mobile phone as in claim 6, wherein, at the same time when entering the unlocking interface, starting an internal timer of the mobile phone, if the touching event is not detected within the pre-determined time period, turning off the backlight of the screen of the mobile phone, and detecting another touching event; if one touching event has been detected, determining if the touching event satisfies the condition required for unlocking.

10. A system for unlocking a screen of a mobile phone, comprising:

a detection module for detecting whether a touching event occurs on the screen;

a calculation module for calculating a touching area;

a determination module for determining whether a touching event satisfies a condition for unlocking the screen; and a control module for unlocking the screen or returning information indicative of an unlocking error; and when the detection module detects that the mobile phone has entered an unlocking interface, the detection module detects whether a touching event occurs on the screen of the mobile phone within a pre-determined time period;

when the touching event has not been detected, a backlight of the screen of the mobile phone is turned off;

when the touching event has been detected:

information of a touching region, corresponding to the touching event is obtained and sent to the calculation module by the determination module;

a touching area is calculated, by the calculation module, based on the information of the touching region, wherein the touching region is divided into a plurality of regular small shapes, wherein respective areas of the plurality of regular small shapes are calculated and added together to determine the touching area;

wherein the touching area is compared with a predetermined threshold by the determination module, and the determination module determines whether the touching event satisfies a condition required for unlocking;

when the touching area is determined to be greater than the predetermined threshold, the determination module determines that the touching event satisfies the condition required for unlocking and sends, to the control module, an instruction for unlocking the screen; and the control module unlocks the screen, wherein the predetermined threshold is an area size;

when the touching area is determined to not be greater than the predetermined threshold, the determination module sends an instruction, indicative of an unlocking failure, to the control module and the control module returns information indicative of an unlocking failure to the user.

11. The system for unlocking a screen of a mobile phone as in claim 10, further comprising:

a setting module for setting the predetermined threshold based on a size of the screen and a size of a palm of the user.

12. The system for unlocking a screen of a mobile phone as in claim 10, wherein the information of the touching region is profile information of a coordinate matrix of the touching region; and wherein the predetermined threshold is 20 square centimeters.

13. The system for unlocking a screen of a mobile phone as in claim 10, wherein the calculation module comprises:

a dividing unit for dividing the touching region into a plurality of regular small shapes according to the profile information of a coordinate matrix of the touching region, and the calculation module calculates respective areas of the plurality of regular small shapes; and an addition unit, for adding the respective areas of the plurality of regular small shapes to determine the touching area.

14. The method for unlocking a screen of a mobile phone as in claim 1, wherein when the mobile phone screen is in a locking state, a user may operate a related key or button of the mobile phone to light up the screen, and to initiate an unlocking program to enter the unlocking interface.

15. The method for unlocking a screen of a mobile phone as in claim 1, wherein a user may set the predetermined threshold as desired.

16. The method for unlocking a screen of a mobile phone as in claim 6, wherein when the mobile phone screen is in a locking state, a user may operate a related key or button of the mobile phone to light up the screen, and to initiate an unlocking program to enter the unlocking interface.

17. The method for unlocking a screen of a mobile phone as in claim 6, wherein a user may set the threshold as desired.

18. The system for unlocking a screen of a mobile phone as in claim 10, wherein when the mobile phone screen is in a locking state, a user may operate a related key or button of the mobile phone to light up the screen, and to initiate an unlocking program to enter the unlocking interface.

19. The system for unlocking a screen of a mobile phone as in claim 10, wherein a user may set the predetermined threshold as desired.

20. The system for unlocking a screen of a mobile phone as in claim 10, wherein the predetermined threshold is set based on a palm size of a human.

\* \* \* \* \*